United States Patent Office 3,114,777
Patented Dec. 17, 1963

3,114,777
TOLYL BIS THIOETHERS
Walter Reifschneider, Midland, Mich., assignor to The Dow Chemical Company, Midland, Mich., a corporation of Delaware
No Drawing. Filed June 27, 1962, Ser. No. 205,526
4 Claims. (Cl. 260—609)

The present invention is directed to thioethers and in particular is directed to novel thioethers corresponding to the formula

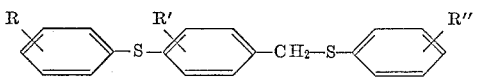

In the present specification and claims, any ring substituent R, R′ and R″ independently represents an alkyl group of from 1 to 4, inclusive, carbon atoms. The compounds having one or more unsubstituted rings are also within the invention: hence any of R, R′ or R″ be hydrogen.

The novel compounds are colorless to pale tan crystalline solids appearing white or off-white in mass, very slightly soluble in water but readily soluble in various common organic solvents such as lower alkanols, benzene and the like. The compounds are useful as insecticides and herbicides; as inhibitors of the germination of fungus spores, they are effective fungistats. The compounds are also useful as additives to improve the properties of lubricating oils especially designed for operation under high pressures and temperatures; they are useful as intermediates in the preparation of dyestuffs and biologically active materials; they are also of value as solvent additives in the modification of behavior of mixed solvent systems, and as alcohol denaturants.

The compounds are prepared by a process which comprises the steps of causing a reaction between a molecular proportion of an α,4-dihalotoluene compound corresponding to the formula

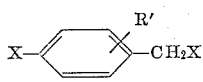

wherein X represents halogen and about one molecular proportion of each of the benzenethiol compounds corresponding to the formulae

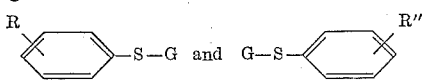

wherein G represents hydrogen, alkali metal, or cuprous copper. During the reaction to prepare the present compounds, a total of 2 moles of benzenethiol reacts with each molecule of dihalotoluene compound. Small amounts of benzenethiol may be lost in side reactions. Thus, when it is desired to prepare a compound of the present invention in a high state of purity and with a minimum of necessary post-synthesis purification procedure, the starting reactants should be employed in the total proportions of 2 moles of benzenethiol compound per mole of dihalotoluene, or preferably, with the benzenethiol in slight excess. However, other proportions may be employed if desired, and unconsumed starting material of whatever identity may, if desired, be recycled into further synthesis process.

The reaction goes forward at temperatures over a wide range such as 30° to 350° C., but initiates most readily when heated to a temperature somewhat higher than room temperature; a preferred temperature range is about 120° to 220° C.: under these conditions the reaction is, in general, exothermic and goes forward to completion with good yield calculated upon the basis of consumed starting material. When employing benzenethiol, hydrogen halide of reaction is evolved and means for its orderly disposal are advantageously provided.

Typically, in the preparation of the compounds of the present invention, reaction between the aromatic thiol starting material and the dihalotoluene starting material will initiate and go forward only when there is employed a catalytic amount of both a source of cuprous ion and a nitrogenous base. In the preparation of many, and probably all of the present compounds, the employment of such catalyst is essential and critical, although the exact weight is not critical. Certainly the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed weight is not critical, but may vary from a very small trace amount, less than 1/100 of 1 molar percent, to as much as an amount equimolecular with either reactant or even greater. In general, the employment of larger amounts is accompanied by no major advantage and, being expensive, is not preferred. When water or reaction is evolved it is advantageously removed, as by the use of a water trap in the reflux condenser system.

The nitrogenous base may be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium such as an aromatic or aliphatic hydrocarbon oil.

It is preferred, at least in laboratory preparations, to employ the nitrogenous base catalyst substance in sufficient excess that portions of it may also act as hydrogen halide acceptor and yet further portions may continue to function, unreacted, in the necessary catalytic manner.

In carrying out the reaction to prepare the compounds of the present invention wherein R and R″ are alike, a molecular proportion of the dihalotoluene compound and about two molecular proportions of the benzenethiol compound are intimately mixed and blended, in any order and in desired amounts, with source of cuprous ion and nitrogenous base as hereinbefore described, and thereafter heated to a temperature at which reaction takes place promptly. In one convenient method of practicing the present method, the reaction temperature may be the reflux temperature of the liquid reaction mixture. In this situation, heating may be continued at the boiling temperature of the reaction mixture and under reflux for a period of time to carry the reaction to completion.

When preparing the present compounds wherein R and R″ are dissimilar, use is made of the fact that the α halogen is invariably more reactive than the ar-halogen, irrespective of the molecular weights of the halogens involved.

With a molecular proportion of such dihalotoluene there is first employed a molecular proportion of benzenethiol compound or substituted benzenethiol compound of the type desired to be added at the site of the α halogen. Reaction between the said substances is carried to substantial completion to obtain an intermediate; thereafter, with or preferably without isolation and purification of the said intermediate, said intermediate is caused to react with a molecular proportion of a second benzenethiol compound of the type desired to be added at the site of aromatic halogen.

Reaction conditions and catalyst requirements are essentially the same as when a compound having R and R″ alike is prepared.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate forms from which the desired product can be extracted as a solvent-soluble fraction. Representative extraction solvents include diethyl ether, chlorinated hydrocarbons, and benzene. The said precipitate is extracted with solvent, the solvent extract dried over an inert drying agent such as, for example, anhydrous potassium carbonate or sulfate; the solvent vaporized and removed and the remaining product chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

EXAMPLE I.—α,4-BIS(PHENYLTHIO)TOLUENE

A reaction mixture is prepared, consisting of 24.6 grams (0.1 mole) of α,4-dibromotoluene, 16 grams of cuprous oxide (technical grade) and 22.1 grams (approximately 0.21 mole) of benzenethiol dispersed in a mixture consisting of 110 milliliters quinoline and 10 milliliters pyridine. The resulting reaction mixture is placed in a flask under reflux, the reflux being equipped with a water trap. In this situation, the reaction mixture is heated at its reflux temperature (a pot temperature between approximately 200° and 240° C.) for 6 hours to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and extracted with ether, the ether extract liquid being saved. This liquid is dried over a bed of anhydrous potassium carbonate; the resulting liquid is warmed to vaporize and remove ether solvent and obtain a crystalline solid. These crystals are taken up in hot ethanol and precipitated therefrom as the ethanol cools to obtain an α,4-bis(phenylthio)toluene as pale tan crystalline plates having a melting point of 74.5°–75° C. Ingestion of this compound, at the rate of 300 parts per million parts by weight of the diet, in food of unrestricted amount, of a group of laboratory mice heavily infested with roundworms, resulted in the complete elimination of said worms without harm to the mice.

EXAMPLE II.—α,4-BIS(p-TOLYLTHIO)TOLUENE

In procedures essentially similar to the foregoing except that the starting mercaptan employed in an amount approximately twice equimolecular with the α,4-dibromotoluene is p-toluenethiol, there is prepared, in good yield, α,4-bis(p-tolylthio)toluene as off-white crystalline plates readily soluble in 95 percent ethanol and in benzene and thiophene and of low solubility in water.

EXAMPLE III.—α-(p-tert-BUTLYPHENYLTHIO)-4-(ISOPROPLYPHENLYTHIO)TOLUENE

The present synthesis takes advantage of the greater reactivity with a thiol, of a bromine side-chain substituent upon an α-ar-dihalotoluene than a ring chlorine substituent. In a mixture of 130 milliliters technical 2,4-lutidine and 60 milliliters quinoline, as mixed liquid reaction medium, is dispersed 8 grams cuprous bromide, 20.15 grams (0.1 mole) α-bromo-4-chlorotoluene and 16.6 grams (0.1 mole) of p-tert-butylbenzenethiol. The resulting reaction mixture is heated, with stirring, at its boiling temperature and under reflux, for 2 hours. Thereafter, there is added 15.2 grams (0.1 mole) of o-isopropylbenzenethiol as heating and stirring are continued. At the conclusion of the reaction time, the resulting hot mixture is poured directly into a mixture of chipped ice and 200 milliliters concentrated hydrochloric acid. As a result of these procedures, the ice melts and a solid separates in the resulting aqueous dispersion. This solid is collected by filtration and a toluene extract made of it. The toluene extract is washed twice with hydrochloric acid and then dried over anhydrous potassium carbonate. From the resulting dry toluene solution, toluene solvent is evaporated, leaving a nearly colorless oily α-(p-tert-butylphenylthio)-4-(o-isopropylthio)toluene having the structural formula

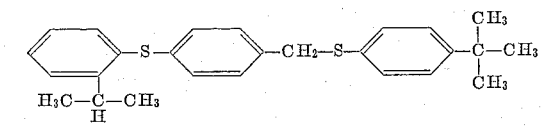

and a molecular weight of 406.7. It is believed that the compound should crystallize at room temperatures, but efforts thereto are not readily successful.

In procedures essentially the same as the foregoing, by the use of appropriate starting materials, other products of the present invention are prepared.

The thiols necessary as starting materials in the practice of the present invention are, for the most part, articles of commerce. However, those which are not can readily be prepared in known procedures such as, for example, the method of Pollak, von Fiedler, and Roth. See Monatsheft für Chemie, 39, pages 179–200 (Vienna, 1917). Other methods are well known to those skilled in the art: see Berichte der deutschen chemischen Gesellschaft, 58, pages 24–26. Other preparations are known. The dihalotoluene compounds are also known, and are prepared in known methods. For example, the direct halogenation of an ar-halotoluene in the absence of catalyst but in the presence of actinic radiation leads directly to a desired ar-α-dihalotoluene. The reaction goes forward well at temperatures about the boiling temperature of water and under reflux, preferably with a moderately less than stoichiometric amount of halogen. This and other methods are well described. See Berichte der deutschen chemischen Gesellschaft, 9, 931 (1876), the method of Jackson.

I claim:
1. A compound corresponding to the formula

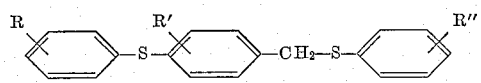

wherein any substituent R, R' and R" represents a member of the group consisting of hydrogen and alkyl of from 1 to 4, inclusive, carbon atoms.

2. α,4-bis(phenylthio)toluene.

3. α,4-bis(p-tolylthio)toluene.

4. α-(p-tert-Butylphenylthio)-4-(o-isopropylphenylthio)toluene.

No references cited.